United States Patent Office 3,591,467
Patented July 6, 1971

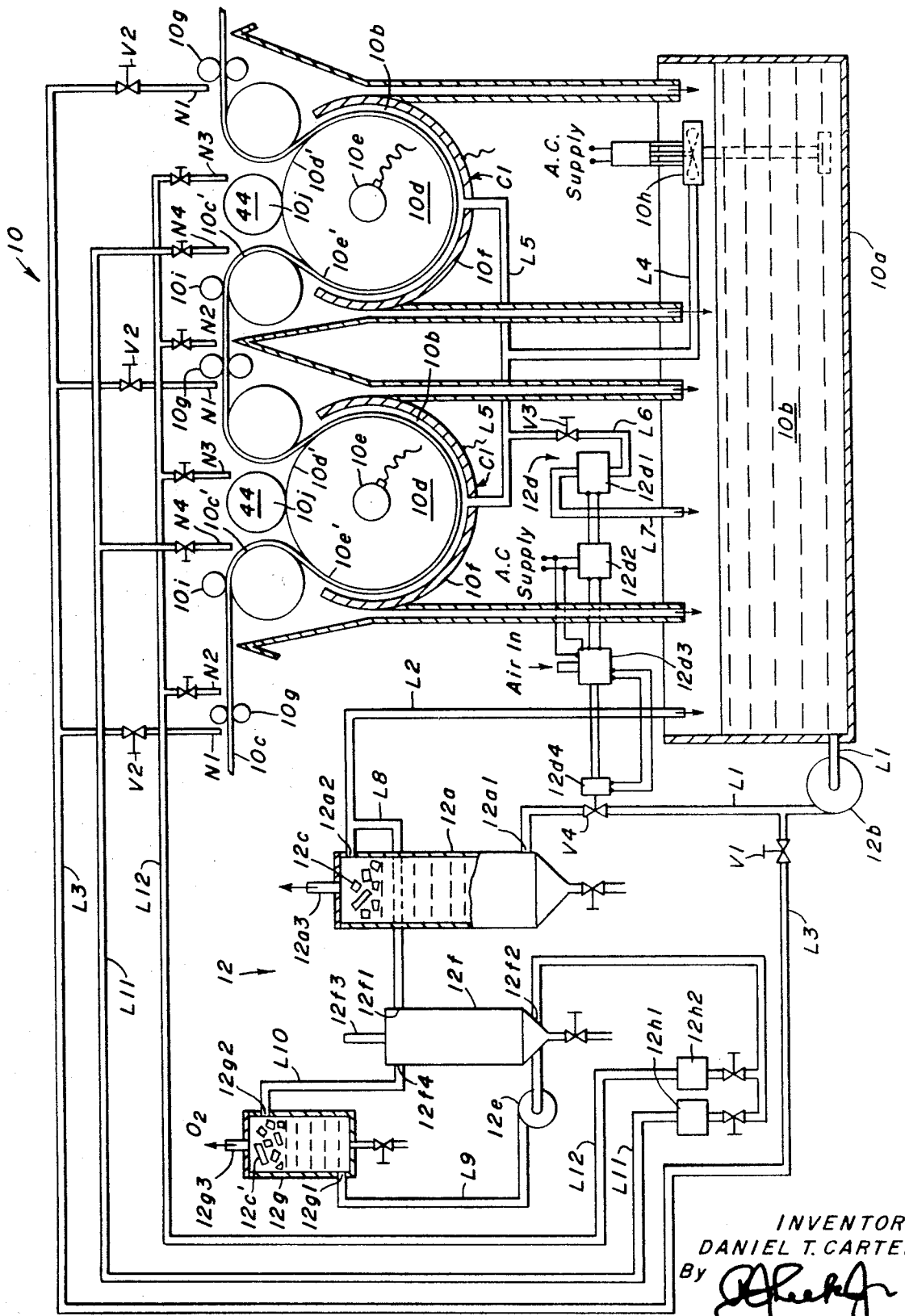

3,591,467
APPARATUS FOR AND METHOD OF PROTECTING A SHEET BEING ELECTROPLATED WITH A METAL
Daniel T. Carter, Penn Township, Westmoreland County, Pa., assignor to United States Steel Corporation
Filed May 9, 1969, Ser. No. 823,377
Int. Cl. C23b 5/58; B01k 3/00
U.S. Cl. 204—28                             24 Claims

ABSTRACT OF THE DISCLOSURE

This invention relates to electroplating and more particularly to an apparatus for and a method of protecting one surface of a moving sheet being electroplated with a metal on a rotary type plating apparatus.

The apparatus has a first reaction means in communication with a tank means of the rotary type apparatus for reacting the metal and the electrolyte and adapted to increase a first predetermined concentration of the metal in an electrolyte of the rotary type apparatus to a second predetermined concentration of the metal and to increase a first predetermined pH value of the electrolyte to a second predetermined pH value without the addition of water to the electrolyte to form a reactivated electrolyte; and a second reaction means in communication with the first reaction means for reacting the metal and the reactivated electrolyte and adapted to increase the second predetermined concentration of the metal in the reactivated electrolyte to a third predetermined concentration of the metal and to increase the second predetermined pH value of the reactivated electrolyte to a third predetermined pH value without the addition of water to the electrolyte to form a protective fluid which is compatible with the electrolyte. The second reaction means has a coating means operable to apply the protective fluid to one of the one surface of the sheet and a rotatable drum of the rotary type apparatus prior to their entrance into a bite between the one surface and the rotatable drum thereby filling the bite with the protective fluid to exclude the electrolyte therefrom and to prevent the pickling of the one surface, the dissolving of the one surface into the electrolyte, and the deposition of insulating compounds in the rotatable drum and to eliminate arcing between the one surface and the rotatable drum.

The method includes the steps of reacting the metal with the electrolyte to increase the first predetermined concentration of the metal in the electrolyte to a second predetermined concentration of the metal and to increase the first predetermined pH value of the electrolyte to a second predetermined pH value without the addition of water to the electrolyte to form a reactivated electrolyte; further reacting the metal with the reactivated electrolyte to increase the second concentration of the metal in the reactivated electrolyte to a third predetermined concentration of the metal and to increase the second predeter mined pH value of the reactivated electrolyte to a third predetermined pH value without the addition of water to the electrolyte to form a protective fluid which is compatible with the electrolyte; and applying the protective fluid to one of the one surface and the rotatable drum prior to their entrance into the bite, thereby filling the bite with the protective fluid to exclude the electrolyte therefrom and to prevent the pickling of the one surface, the dissolving of the one surface into the electrolyte, and the deposition of insulating compounds on the rotatable drum and to eliminate arcing between the one surface and the rotatable drum.

BACKGROUND OF THE INVENTION

In a high acid (such as 70 to 100 grams per liter of free acid) electrolytic plating process of, for example, a steel sheet with a metal, such as zinc, if the electrolyte is allowed to enter between the one surface of the sheet and the rotatable drum surface, electrolytic pickling action occurs between the contacting surfaces of the rotatable drum and the one surface of the steel sheet. This is critically true in producing one-side zinc coated steel sheets where the contact surface of the sheet is bare steel unprotected by a zinc coating. Such pickling action causes insulating compounds, such as iron sulphate and the like, to be deposited on the contact surface of the rotatable drum, thereby effecting a voltage drop between the aforementioned contact surfaces. As small areas of this insulating layer abrade, the plating current density increases at such areas and causes severe arcing between the contact surfaces. The pickling action also dissolves iron from the steel sheet, thereby increasing the iron content of the electrolyte rapidly. If such iron content is in excess of about 5 grams/liter, plating efficiency and electrolyte conductivity are reduced to an unacceptable level. Additionally, pickling action imparts an unacceptable appearance to the uncoated side of a one-side coated sheet and removes zinc from a two-side coated sheet.

I am aware of the U.S. Pat. Nos. 2,035,517, issued Mar. 31, 1936, to Yates and 2,075,331, issued Mar. 30, 1937, to Antisell.

OBJECTS OF THE INVENTION

It is the general object of this invention to avoid and overcome the foregoing and other difficulties of and objections to prior art practices by the provision of an improved apparatus for and method of protecting one surface of a sheet being electroplated with a metal, the apparatus and method:

(1) provide a protective fluid manufactured from the electrolyte without the addition of water or any other chemical thereby eliminating the need for water removal by evaporation and the like;

(2) provide a protective fluid which maintains the contact surfaces between the sheet and the rotatable drum at a relatively high pH value, high metal concentration, and high electrical conductance independently of the composition of the electrolyte;

(3) fill the bite between the sheet and the rotatable drum with protective fluid to exclude electrolyte therefrom;

(4) eliminate pickling of the sheet and the rotatable drum;

(5) eliminate the dissolving of the sheet into the electrolyte;

(6) prevent the deposition of insulating components on the rotatable drum and the sheet;

(7) eliminate arcing between the sheet and the rotatable drum;

(8) provide an acceptable appearance on the plated sheet; and (9) permit electroplating in a high acid electrolyte with large plating currents of about 30,000 amperes per plating cell.

BRIEF SUMMARY OF THE INVENTION

The aforesaid objects of this invention, and other objects which will become apparent as the description proceeds, are achieved by providing an apparatus for and a method of protecting one surface of a moving sheet being electroplated with a metal on a rotary type plating apparatus.

The apparatus has a first reaction means in communication with a tank means of the rotary type apparatus for reacting the metal and the electrolyte and adapted to increase a first predetermined concentration of the metal in the electrolyte of the rotary type apparatus to a second predetermined concentration of the metal and to increase a first predetermined pH value of the electrolyte to a second predetermined pH value without the addition of water to the electrolyte to form a reactivated electrolyte; and a second reaction means in communication with the first reaction means for reacting the metal and the reactivated electrolyte and adapted to increase the second predetermined concentration of the metal in the reactivated electrolyte to a third predetermined concentration of the metal and to increase the second predetermined pH value of the reactivated electrolyte to a third predetermined pH value without the addition of water to the electrolyte to form a protective fluid which is compatible with the electrolyte. The second reaction means has a coating means operable to apply the protective fluid to one of one surface of the sheet and a rotatable drum of the rotary type apparatus prior to their entrance into a bite between the one surface and the rotatable drum, thereby filling the bite with the protective fluid to exclude the electrolyte therefrom and to prevent the pickling of the one surface, the dissolving of one surface into the electrolyte, and the deposition of insulating compounds on the rotatable drum and to eliminate arcing between the one surface and the rotatable drum.

The method includes the steps of reacting the metal with the electrolyte to increase the first predetermined concentration of the metal in the electrolyte to a second predetermined concentration of the metal and to increase the first predetermined pH value of the electrolyte to a second predetermined pH value without the addition of water to the electrolyte to form a reactivated electrolyte; further reacting the metal with the reactivated electrolyte to increase the second concentration of the metal in the reactivated electrolyte to a third predetermined concentration of the metal and to increase the second predetermined pH value of the reactivated electrolyte to a third predetermined pH value without the addition of water to the electrolyte to form a protective fluid which is compatible with the electrolyte; and applying the protective fluid to one of the one surface and the rotatable drum prior to their entrance into the bite, thereby filling the bite with the protective fluid to exclude the electrolyte therefrom and to prevent the pickling of the one surface, the dissolving of the one surface into the electrolyte, the deposition of insulating compounds on the rotatable drum and to eliminate arcing between the one surface and the rotatable drum.

BRIEF DESCRIPTION OF THE VIEW OF THE DRAWING

For a better understanding of this invention reference should be had to the accompanying drawing, wherein like numerals of reference indicate similar parts throughout the view and wherein:

FIG. 1 is a diagrammatic side elevational view of the rotary type plating apparatus and the improved apparatus of the present invention for protecting one surface of a sheet being electroplated on the rotary type plating apparatus.

Although the principles of this invention are broadly applicable to the plating of a sheet with a metal, this invention is particularly adapted for use in conjunction with the plating of zinc on a steel sheet and hence it has been so illustrated and will be so described.

DETAILED DESCRIPTION

With specific reference to the form of this invention illustrated in the drawings, and referring particularly to the figure, a rotary-type plating apparatus of the type disclosed in U.S. patent application Ser. No. 526,730 and now Pat. No. 3,483,113, filed Feb. 11, 1966 by the present inventor and assigned to the same assignee as the present invention, is indicated generally by the reference numeral 10.

ROTARY-TYPE PLATING APPARATUS 10

This rotary-type plating apparatus 10 has tank means, such as the tank 10$a$, adapted to contain an electrolyte 10$b$. This electrolyte 10$b$ for plating a metal, such as for example zinc or the like, on a moving steel sheet 10$c$ has a first predetermined concentration of zinc of about 60 grams of zinc/liter of electrolyte 10$b$ and about 80 grams of an acid, such as sulphuric acid or the like/liter of electrolyte 10$b$ to give a first predetermined pH value of the electrolyte of about 0 pH. The rotary type plating apparatus 10 has a rotatable drum 10$d$ rotatable on a shaft 10$e$ in the electrolyte 10$b$ for guiding the sheet 10$c$ (as a cathode) and under tension into a bite 10$e'$ between the surface 10$c'$ (to be protected from electroplating with zinc) and the rotatable drum 10$d$ along its path of movement through the electrolyte 10$b$. In addition, the rotary type plating apparatus 10 has anode means, such as the anode 10$f$, in the electrolyte 10$b$ adjacent the rotatable drum 10$d$.

APPARATUS 12

The apparatus 12 of the present invention for protecting the one surface 10$c'$ of the sheet 10$c$ being electroplated with the zinc on the rotary-type plating apparatus 10 has a first reaction means, such as a first reaction tower 12$a$, having an inlet 12$a$1 in communication with the tank 10$a$ by line L1 and a pump 12$b$ (having about a 10 g.p.m. capacity) for the purpose of reacting the zinc pigs 12$c$ in the tower 12$a$ and the electrolyte 10$b$ having a zinc concentration of about 60 grams zinc/liter of electrolyte to increase the first predetermined concentration of the zinc in the electrolyte 10$b$ (namely about 60 grams of zinc/liter of electrolyte) to a second predetermined concentration of the zinc (i.e. about 113 grams of zinc/liter of electrolyte).

The first reaction tower 12$a$ is about 8 feet in height, has a capacity of about 690 cubic feet, is lead lined and filled with zinc pigs 12$c$. For the purpose of returning the reactivated electrolyte 10$b$ to the storage tank 10$a$, the first reaction tower 12$a$ is provided with an outlet 12$a$2, which outlet 12$a$2 communicates via line L2 with the tank 10$a$. The means utilized to maintain constant the overflow level in the outlet 12$a$2 and in the first reaction tower 12$a$, is a standpipe 12$a$3.

In order to remove or pickle off any oxides from the surface 10$c'$ of the sheet 10$c$ prior to the entrance of the sheet 10$c$ into exit wringer rolls 10$g$, the pump 12$b$ pumps a portion of the electrolyte 10$b$ (to be reactivated in the first reaction tower 12$a$) through valve V1 in line L3 and valves V2 to nozzles NI adjacent the surface 10$c'$ and the exit wringer rolls 10$g$.

As shown in FIG. 1, a pump 10$h$ pumps electrolyte through lines L4, L5 to the cells C1 of the apparatus 10. A sampling element 12$d$1 of a control means 12$d$ for monitoring the specific gravity of the electrolyte 12$b$ in the tank 10$a$ and for indicating the zinc concentration of such electrolyte 10$b$, is connected by a line L6 to the electrolyte supply system through a valve V3 and to the tank 10a by a line L7.

CONTROL MEANS 12d

This sampling element 12d1 which may be a Princo Densitrol Transmitter of the type manufactured by Precision Thermometer and Instrument Company, Southampton, Pa., is connected to a control element 12d2 of the sampling element 12d1. In turn the control element 12d2 feeds its signals to a receiver element or recorder controller 12d3 similar to a Model 152P13VH–75–III–11, manufactured by Minneapolis Honeywell Regulator Company, Philadelphia, Pa., which receiver element 12d3 operates a pneumatic operator element 12d4 (of either the piston or diaphragm type, for example, a type 656 manufactured by Lunkenheimer Company, Cincinnati, Ohio) and attached to the valve V4.

This control means 12d, of course, controls the flow of electrolyte 10b through line L1 to the first reaction tower 12a. The average flow of electrolyte 10b therethrough for a plating current of about 30,000 amperes is about 160 g.p.h. The reacted electrolyte 10b through outlet 12a2 as a pH of about 1.7 to 1.9 and a zinc concentration of about 113 grams/liter. In order to raise the pH of the desired protective fluid 10b' above the desired minimum of about 2.2, a 30 to 50 g.p.m. pump 12e pumps the fluid 10b through line L8, a storage tank 12f (having inlet 12f1, outlet 12f2 and standpipe 12f3), and a line L9 to a second reaction means, such as a second reaction tower 12g (having inlet 12g1, outlet 12g2 and standpipe 12g3). Line L10 connects outlet 12g2 of the second reaction tower 12g to a second inlet 12f4 of the storage tank 12f.

This second reaction tower 12g reacts zinc pigs 12c' contained therein and the reactivated electrolyte 10b to increase the second predetermined zinc concentration (i.e. about 113 grams of zinc/liter of electrolyte 10b) in the reactivated electrolyte 10b to a third predetermined concentration of zinc (i.e. about 113.5 grams/liter) and to increase the second predetermined pH value (i.e. about 1.7 to 1.9) of the reactivated electrolyte 10b to a third predetermined pH value (i.e. about 2.5) without the addition of water to the reactivated electrolyte 10b to form the desired protective fluid 10b' which is compatible with the reactivated electrolyte 10b.

This second reaction tower 12g has an active height of about 3 feet 6 inches and an active capacity of about 13 cubic feet and is filled with zinc pigs 12c' of smaller size than the zinc pigs 12c in the first reaction tower 12a in order to provide a maximum surface area.

Since the flow or quantity of protective fluid 10b' is limited to about 160 g.p.h. per 30,000 amperes plating cell, it is necessary to accurately meter the flow of the protective fluid 10b' through lines L11, L12 by means of a dual channel proportioning pump 12h1, 12h2 having a capacity of about 150 g.p.h. per line L11, L12 (for two (2) 30,000 ampere plating cells).

The flow through line L12 is adjusted to deliver about 120 g.p.h. and delivers about 30 g.p.h. each to the nozzles N2 and N3. The protective fluid 10b' delivered by nozzle N2 to the entering sheet 10c rinses off any residue electrolyte 10b passing through the final wringer rolls 10g from the preceding plating cell C1 and provides a cover of protective liquid 10b' to prevent the formation of insulating oxides on the sheet surface 10c'. Wringer roll 10i removes the contaminated protective fluid 10b' from the sheet 10c. The protective fluid 10b' delivered by nozzle N3 rinses stray electrolyte 10b off the conductive surface 10d' of the rotatable drum 10d and the slight acid content of the protective fluid 10b' dissolves insulating oxides from the conductive surface 10d' of the rotatable drum 10d. Wringer roll 44 removes the contaminated protective fluid 10b' from the rotatable drum surface 10d'.

The second channel or line L11 of the proportioning pump 12h is adjusted to deliver about 60 g.p.h. to nozzle N4 which nozzle N4 directs the protective fluid 10b' into the "bite" between the sheet 10c and the rotatable drum 10d, thus excluding electrolyte 10b from entering between the sheet 10c and the conducting surface 10d' of the rotatable drum 10d. A "belt" of the protective fluid 10b' passes around the rotatable drum 10d between the sheet 10c and the conducting surface 10d' of the rotatable drum 10d. The presence of this high pH zinc bearing protective fluid 10b' between the sheet 10c and the conducting surface 10d' of the rotatable drum 10d prevents arcing therebetween, prevents pickling of the bare steel sheet surface 10c', prevents deterioration of the conducting surface 10d' of the rotatable drum 10d, and causes or permits the stainless steel conducting surface 10d' of the rotatable drum 10d to take on a whitish colored appearance and to assume and maintain a highly conductive state. The presence of the protective fluid 10b' also prevents the removal of zinc from the contacting surface 10c' of a two-side coated sheet 10c.

The protective fluid 10b' is not a dilute electrolyte nor merely an electrolyte. It is a fluid, containing a certain concentration of free acid (i.e. namely about 0.16 gram/liter) and zinc (i.e. about 113.5 grams/liter) differing appreciably from the free acid (i.e. about 80 grams/liter) and zinc concentrations (i.e. about 60 grams/liter) of the plating electrolyte 10b. This difference is brought about by a chemical reaction in the reaction towers 12a, 12g without the addition of water. Water additions are not desirable since some means must be employed to remove the water from the plating electrolyte 10b. Since the protective fluid 10b' is derived from the plating electrolyte 10b and replaces the zinc plated out of the plating electrolyte 10b, it is desirable to return the protective fluid 10b' into the plating electrolyte 10b.

A protective fluid consisting of water only and a zinc plating electrolyte diluted with water to a pH of 2.2 to 3 was tried. The conducting surface 10d' of the rotatable drum 10d lost its ability to transfer the plating current to the sheet 10c and severe arcing occurred.

The control parameters of the control means 12d, regulating the flow of electrolyte 10b from tank 10a to the first reaction tower 12a are determined to provide (through the valve V4 in line L1) a near uniform flow of electrolyte 10b, substantially free of transients so that the pH of the reactivated fluid 10b and protective fluid 10b' delivered to storage tank 12f is held at 1.7 pH or higher.

SUMMARY OF THE ACHIEVEMENT OF THE OBJECTS OF THE INVENTION

It will be recognized by those skilled in the art that the objects of this invention have been achieved by providing an improved apparatus 10 for and method of protecting one surface 10c' of a sheet 10c being electroplated with a metal. The apparatus 10 and method:

(1) provide a protective fluid 10b' manufactured from the electrolyte 10b without the addition of water or any other chemical thereby eliminating the need for water removal by evaporation and the like;

(2) provide a protective fluid 10b' which maintains the contact surfaces 10c', 10d' between the sheet 10c and the rotatable drum 10d at a relatively low pH value, high metal concentration, and high electrical conductance independently of the composition of the electrolyte 10b;

(3) fill the bite between the sheet 10c and the rotatable drum 10d with protective fluid 10b' and exclude electrolyte 10b therefrom;

(4) eliminate pickling of the sheet 10c and the rotatable drum 10d;

(5) eliminate the dissolving of the sheet 10c into the electrolyte 10b;

(6) prevent the deposition of insulating compounds on the rotatable drum 10d and the sheet 10c;

(7) eliminate arcing between the sheet 10c and the rotatable drum 10d;

(8) provide an acceptable appearance on the plated sheet 10c; and (9) permit electroplating in a high acid electrolyte with large plating currents of about 30,000 amperes per plating cell.

While in accordance with the patent statutes preferred and alternative embodiments of this invention have been illustrated and described in detail, it is to be particularly understood that the invention is not limited thereto or thereby.

I claim:

1. Apparatus for protecting one surface of a moving sheet being electroplated with a metal on a rotary-type plating apparatus having tank means adapted to contain an electrolyte having a first predetermined concentration of said metal and a first predetermined pH value, a rotatable drum rotatable in said electrolyte for guiding said sheet as a cathode and under tension in a bite between said one surface and said rotatable drum along its path of movement through said electrolyte and anode means in said electrolyte adjacent said rotatable drum, said apparatus having:

(a) a first reaction means in communication with said tank means for reacting said metal and said electrolyte and adapted to increase said first predetermined concentration of said metal in said electrolyte to a second predetermined concentration of said metal and to increase said first predetermined pH value of said electrolyte to a second predetermined pH value without the addition of water to said electrolyte to form a reactivated electrolyte; and (b) a second reaction means in communication with said first reaction means for reacting said metal and said reactivated electrolyte and adapted to increase said second predetermined concentration of said metal in said reactivated electrolyte to a third predetermined concentration of said metal and to increase said second predetermined pH value of said reactivated electrolyte to a third predetermined pH value without the addition of water to said electrolyte to form a protective fluid which is compatible with said electrolyte, (1) said second reaction means having a coating means operable to apply said protective fluid to one of said one surface and said rotatable drum prior to their entrance into said bite thereby filling said bite with said protective fluid to exclude said electrolyte therefrom and to prevent the pickling of said one surface, the dissolving of said one surface into said electrolyte, and the deposition of insulating compounds on said rotatable drum and to eliminate arcing between said one surface and said rotatable drum.

2. The apparatus recited in claim 1 wherein said second reaction means has a second inlet and a second outlet and having storage tank means in communication with said first reaction means, said second inlet and said second outlet for mixing the reactivated electrolyte and said protective fluid.

3. The apparatus recited in claim 1 and having control means in communication with said tank means and said first reaction means for monitoring the specific gravity of said electrolyte to indicate the concentration of said metal in said electrolyte and to control the flow of said electrolyte to said first reaction means.

4. The apparatus recited in claim 1 wherein said first reaction means has a first outlet and a first level control means to maintain the level in said first reaction means at the level in said first outlet.

5. The apparatus recited in claim 4 wherein said second reaction means has a second inlet and a second level control means to maintain the level in said second reaction means at the level in said first outlet.

6. The apparatus recited in claim 1 wherein said second reaction means has proportioning means to proportion the protective fluid from said second reaction means.

7. The apparatus recited in claim 1 wherein said tank means has a pickling means operable to apply electrolyte to said one surface to clean said one surface prior to the application of said protective fluid.

8. The apparatus recited in claim 7 and having a first wringer means for removing deleterious material from said cleaned one surface.

9. The apparatus recited in claim 7 wherein said second reaction means has rinsing means for rinsing said cleaned one surface with said protective fluid.

10. The apparatus recited in claim 9 and having a second wringer means for removing deleterious material from said rinsed one surface.

11. The apparatus recited in claim 1 wherein said coating means coats said one surface.

12. The apparatus recited in claim 1 wherein said coating means coats said rotatable drum.

13. The apparatus recited in claim 12 and having a third wringer means for removing deleterious material from said rotatable drum.

14. A method for protecting one surface of a moving sheet being electroplated with a metal on a rotary-type plating apparatus having tank means adapted to contain an electrolyte having a first predetermined concentration of said metal and a first predetermined pH value, a rotatable drum rotatable in said electrolyte for guiding said sheet as a cathode and under tension in a bite between said one surface and said rotatable drum along its path of movement through said electrolyte and anode means in said electrolyte adjacent said rotatable drum, said method including the steps of:

(a) reacting said metal with said electrolyte to increase said first predetermined concentration of said metal in said electrolyte to a second predetermined concentration of said metal and to increase said first predetermined pH value of said electrolyte to a second predetermined pH value without the addition of water to said electrolyte to form a reactivated electrolyte, (b) further reacting said metal with said reactivated electrolyte to increase said second concentration of said metal in said reactivated electrolyte to a third predetermined concentration of said metal and to increase said second predetermined pH value of said reactivated electrolyte to a third predetermined pH value without the addition of water to said electrolyte to from a protective fluid which is compatible with said electrolyte, and (c) applying said protective fluid to one of said one surface and said rotatable drum prior to their entrance into said bite, thereby filling said bite with said protective fluid to exclude said electrolyte therefrom and to prevent the pickling of said one surface, the dissolving of said one surface into said electrolyte, and the deposition of insulating compounds on said rotatable drum and to eliminate arcing between said one surface and said rotatable drum.

15. The method recited in claim 14 and including the step of mixing the reactivated electrolyte and said protective fluid.

16. The method recited in claim 14 and including the step of monitoring the specific gravity of said electrolyte to indicate the concentration of said metal in said electrolyte and to control the flow of said electrolyte.

17. The method recited in claim 14 including the step of proportioning the protective fluid.

18. The method recited in claim 14 and including the steps of applying electrolyte to said one surface to clean said one surface prior to the application of said protective fluid.

19. The method recited in claim 18 and including the step of removing deleterious material from said cleaned one surface.

20. The method recited in claim 18 including the step of rinsing said cleaned one surface with said protective fluid.

21. The method recited in claim 20 and including removing deleterious material from said rinsed one surface.

22. The method recited in claim 14 wherein said one surface is coated.

23. The method recited in claim 14 wherein said rotatable drum is coated.

24. The method recited in claim 23 and including the step of removing deleterious material from said rotatable drum.

References Cited

UNITED STATES PATENTS

| 2,035,417 | 3/1936 | Yates | 204—207 |
| 2,075,331 | 3/1937 | Antisell | 204—28 |
| 2,244,423 | 6/1941 | Hall | 204—209 |
| 2,477,808 | 8/1949 | Jones | 204—211 |
| 2,933,438 | 4/1960 | Lancy | 204—207 |
| 3,483,113 | 12/1969 | Carter | 204—206 |

JOHN H. MACK, Primary Examiner

T. TUFARIELLO, Assistant Examiner

U.S. Cl. X.R.

204—207, 234, 275